E. N. HUMPHREY.
FASTENER FOR CURTAINS AND THE LIKE.
APPLICATION FILED MAR. 25, 1919.

1,308,545.

Patented July 1, 1919.

INVENTOR
E. N. Humphrey
BY
ATTORNEY

UNITED STATES PATENT OFFICE.

ERNEST N. HUMPHREY, OF NEW BRITAIN, CONNECTICUT.

FASTENER FOR CURTAINS AND THE LIKE.

1,308,545. Specification of Letters Patent. Patented July 1, 1919.

Application filed March 25, 1919. Serial No. 284,915.

*To all whom it may concern:*

Be it known that I, ERNEST N. HUMPHREY, a citizen of the United States of America, residing at New Britain, Conn., have invented a new and useful Fastener for Curtains and the like, of which the following is a specification.

The main object of my invention is to provide a simple construction which can be made at reasonable cost and readily applied and which can be used under all ordinary conditions to fasten a part of a curtain or the like to a support or other element. Other devices which are now in use frequently get out of order and become difficult or impossible to operate and it is one of my objects to eliminate these difficulties.

In its preferred form the invention contemplates the combination of a headed stud on one member and a movable slide on the other member provided with an operating lever. For convenience the locking member or slide is mounted in a frame or housing to which the operating lever is pivoted and a spring is provided for holding the operating lever and slide in either of two positions.

Fig. 2, is a front view of the fastener as applied to a corner of a curtain or the like.

Fig. 3, is a rear view of the parts applied to the corner of a curtain or the like.

The fragment of curtain 10 carries what may for convenience be termed the main movable parts of the fastener. The member 11 indicates what is commonly a stationary support to which the curtain or the like is to be attached.

Figure 3:
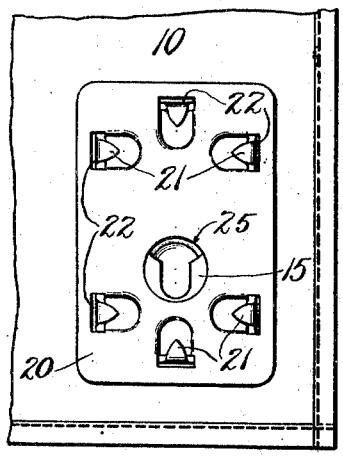

The housing or frame 12 in the form shown has integral lugs 13, 13 to which is pivoted the operating lever 14. The locking member 15 mounted to slide in the housing is provided with two oppositely disposed projections or pins 16 which engage in elongated slots in the inner arms 17, 17 of the operating lever. A plate 18 which covers the rear of the housing is provided with an integral spring finger 19 which presses against the curved ends of the arms 17, 17 so as to yieldingly hold the slide and operating lever in either the full line or the dotted position of Fig. 4. The back plate 20 is located on the opposite face of the curtain 10 and secured in place by a number of fingers 21, 21 carried by the housing 12 which pass through the curtain and through the holes 22, 22 in the plate 20 and are bent over to engage the plate 20 as shown in Fig. 3 so as to hold the parts together.

Figure 1:
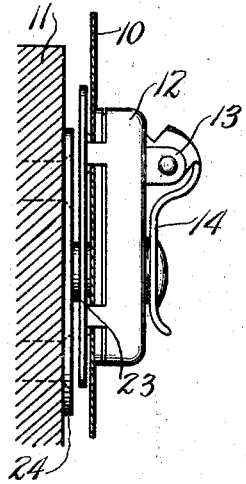
Figure 1, is a side view of a device embodying my invention showing a part of a curtain and support in section with the parts applied thereto.
Figure 2:
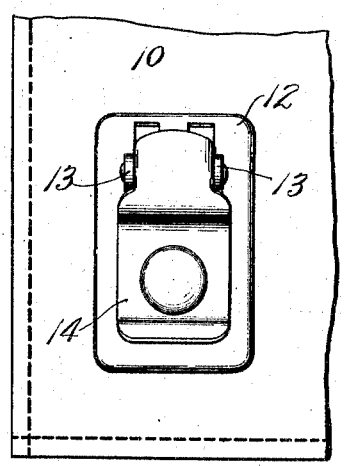
Figure 6:
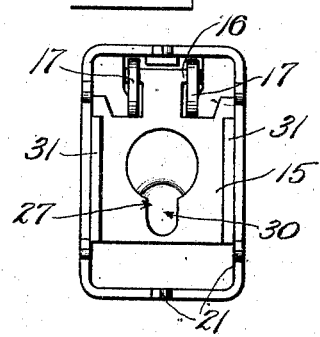
Fig. 6 is a rear view of the parts shown in Fig. 4 with the spring plate of Fig. 3 removed.
Figure 7:
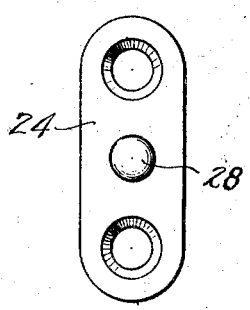
Fig. 7, is a face view of the stud member.
Figure 8:
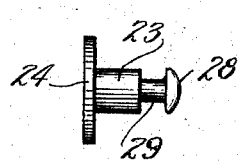
Fig. 8, is a side view of the same.
Figure 9:
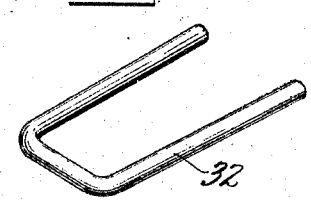
Fig. 9, is a detail perspective view of a spacing member which may be used with a slightly modified form of locking slide.

The stud 23 in the form shown, is provided with a base plate 24 for suitably mounting it. The plate 20 is provided with an aperture 25 and the spring plate 18 is provided with an aperture 26 and the locking slide 15 is provided with a key hole shaped aperture 27 for the stud. The end of the stud 28 is the only part which is intended to project through the locking slide and the neck of the stud is preferably grooved or reduced in diameter at 29 to receive the narrow part of the slot 27. A recess 30 is preferably formed in the rear of the front of the housing to receive the head 28 of the stud. In the form shown in Figs. 1, 4 and 6 the locking slide 15 is provided with flanges 31, 31 which guide the slide between the housing and the plate 18. A spacing member, such as 32, may however be substituted for the flanges 31, 31.

Figure 4:
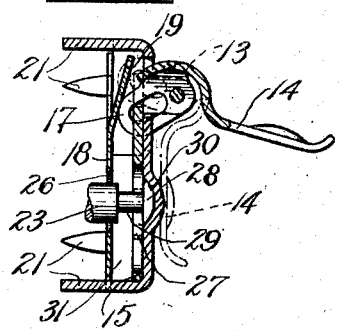
Fig. 4, is a sectional view of the principal parts of the device showing the end of the stud which co-acts with the locking slide. This shows the operating lever and slide in full lines in position to receive the stud and in dotted lines in the locked position.
Figure 5:
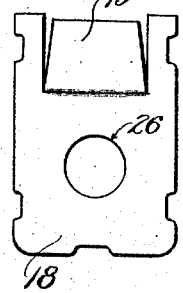
Fig. 5, is a detail view of a plate and spring finger.

In operation, the lever 14 is raised to the full line position shown in Fig. 4 in order to insert the head of the stud through the locking plate. The lever is then closed to the dotted line position in Fig. 4 thereby locking the slide and the movable parts of the device to the relatively stationary stud. The operating lever 14 thus serves as an indicator showing that the parts are not locked when the handle is raised, and the slide is in the locked position when the handle is closed down against the housing.

When the operating lever 14 is out in the open position, it serves as a convenient means for engaging the fastener to move the parts into operative relation.

One advantage of this construction is that the stud being round, the angular position of the base of the stud with relation to the axis of the stud has no effect on the connecting up of the parts.

I claim:—

1. A fastener comprising, the combination of a housing adapted to be secured to a curtain, a slide in the housing, a hinged member having an external finger piece for operating said slide and a stud adapted to be secured to a support and to be engaged by said slide.

2. A fastener comprising, the combination of a stud having a grooved shank, a housing, a member carried thereby and having a key hole slot adapted to co-act with the grooved end of said stud and an operating member for controlling the same, said operating member being hinged to the housing and projecting therefrom when releasing said stud and folding against said housing when interlocking the parts.

3. A fastener member including a relatively stationary supporting member having projecting lugs, a slide carried by said supporting member and having oppositely projecting pins, an operating member hinged to said lugs and having a finger piece and slotted arms, the said arms engaging said pins.

4. A fastener member comprising, a housing, a slide therein, an operating member connected to said slide and a plate closing the rear of said housing and provided with a spring finger for holding the slide yieldingly in position 5. A fastener member comprising, a housing, a slide mounted therein, an operating member pivoted to the housing and connected to said slide, a plate at the back of the housing having a spring finger engaging said operating member to hold it in either of two positions.

6. A fastener member comprising, a housing, a slide mounted therein and having a projecting pin, an operating lever pivoted to said housing, having a portion extending outside thereof for digital operation and having another portion extending inside of the housing and provided with a slot for receiving said pin.

7. A fastener member comprising, a housing, a slide mounted therein and having a projecting pin, an operating lever pivoted to said housing, having a portion extending outside thereof for digital operation and having another portion extending inside of the housing and provided with a slot for receiving said pin, and a spring bearing on the inner end of said operating member.

8. A fastener member comprising, a front portion, a back portion, means for securing them together and to a curtain or the like, a locking slide and an operating member, the back portion having an opening for a stud adapted to coact with the locking slide.

9. A fastener member comprising, a housing, a slide mounted therein, said housing having a recess for the head of a stud between said slide and one face thereof, said slide having an opening for the passage of the head of a grooved stud adapted to be engaged thereby and an operating member.

10. A fastener member comprising, a housing, a slide mounted therein, said housing having a recess for the head of a stud between said slide and one face thereof, said slide having an opening for the passage of the head of a grooved stud adapted to be engaged thereby, an operating member and a back plate for the housing having an integral spring finger engaging a movable part to hold the same yieldingly in position.

ERNEST N. HUMPHREY.

Copies of this patent may be obtained for five cents each, by addressing the "Commissioner of Patents, Washington, D. C."